United States Patent
Hernandez-Vazquez et al.

(10) Patent No.: US 12,188,561 B2
(45) Date of Patent: Jan. 7, 2025

(54) HIGH PRESSURE OFFSET SEAL

(71) Applicant: Freudenberg-NOK General Partnership, Plymouth, MI (US)

(72) Inventors: Eduardo Hernandez-Vazquez, Fishers, IN (US); William Aron Whaley, Indianapolis, IN (US)

(73) Assignee: Freudenberg-NOK General Partnership, Plymouth, MI (US)

( * ) Notice: Subject to any disclaimer, the term of this patent is extended or adjusted under 35 U.S.C. 154(b) by 104 days.

(21) Appl. No.: 17/965,752

(22) Filed: Oct. 13, 2022

(65) Prior Publication Data
US 2024/0125390 A1   Apr. 18, 2024

(51) Int. Cl.
*F16J 15/32*   (2016.01)
*F16J 15/3224*   (2016.01)

(52) U.S. Cl.
CPC ................... *F16J 15/3224* (2013.01)

(58) Field of Classification Search
CPC .................................................. F16J 15/3224
See application file for complete search history.

(56) References Cited

U.S. PATENT DOCUMENTS

| | | | |
|---|---|---|---|
| 2,896,979 A | 7/1959 | Stephens | |
| 3,623,738 A * | 11/1971 | MacDonnell | F16J 15/3224 277/504 |
| 4,017,089 A * | 4/1977 | Kurata | F16J 15/52 277/637 |
| 4,172,599 A * | 10/1979 | Forch | F16J 15/322 277/572 |
| 4,385,673 A * | 5/1983 | Olt, Jr. | B62D 55/0842 180/9.5 |
| 4,575,162 A * | 3/1986 | Smith | F16J 15/52 403/36 |
| 5,909,880 A * | 6/1999 | Waskiewicz | F16C 33/7853 277/561 |

(Continued)

FOREIGN PATENT DOCUMENTS

| | | |
|---|---|---|
| DE | 885950 C | 8/1953 |
| DE | 102010061819 A1 | 5/2012 |

(Continued)

*Primary Examiner* — Vishal A Patel
(74) *Attorney, Agent, or Firm* — Daniel J. Sepanik, Esq.; Harness, Dickey & Pierce, P.L.C.

(57) ABSTRACT

A sealing system includes an outer member having a bore and an inner member received in the bore, the inner member including an outer surface with a shoulder. A seal member includes an outer annular insert having a first diameter and an inner annular insert having a second smaller diameter. An elastomeric body includes an outer portion over-molded on the outer annular insert and an inner portion over-molded on the inner annular insert and including an inner seal member extending radially inward from the inner annular insert. The elastomeric body including a webbing connecting the outer portion to the inner portion. the elastomeric body including a plurality of ribs extending radially outward from the inner portion of the elastomeric body along an interface between the webbing and the inner portion of the elastomeric body. The inner portion of the elastomeric body is against the shoulder on the inner member.

3 Claims, 2 Drawing Sheets

(56) References Cited

U.S. PATENT DOCUMENTS

| | | | | |
|---|---|---|---|---|
| 6,298,955 | B1* | 10/2001 | Frost | F16J 3/042 |
| | | | | 277/561 |
| 7,513,690 | B2* | 4/2009 | Yamamoto | F16J 15/3224 |
| | | | | 277/572 |
| 7,670,078 | B2* | 3/2010 | Elterman | F16C 11/0671 |
| | | | | 403/50 |
| 8,002,287 | B2* | 8/2011 | Wagner | F16L 5/10 |
| | | | | 277/573 |
| 9,746,081 | B2* | 8/2017 | Wagner | F16J 15/3224 |
| 2005/0173869 | A1 | 8/2005 | Wagner | |
| 2006/0220323 | A1* | 10/2006 | Frostick | F16J 15/52 |
| | | | | 277/500 |
| 2008/0036159 | A1* | 2/2008 | Yanagi | F16J 15/3276 |
| | | | | 277/594 |
| 2008/0217865 | A1* | 9/2008 | Sedlar | F16J 15/3244 |
| | | | | 277/572 |
| 2008/0258406 | A1* | 10/2008 | Dahlheimer | F16J 15/3276 |
| | | | | 277/569 |
| 2011/0049815 | A1* | 3/2011 | Wagner | F16J 15/3224 |
| | | | | 277/650 |
| 2013/0307228 | A1* | 11/2013 | Wagner | F16J 15/3252 |
| | | | | 277/650 |
| 2015/0219219 | A1 | 8/2015 | Fei et al. | |

FOREIGN PATENT DOCUMENTS

| | | |
|---|---|---|
| EP | 0859174 A1 | 8/1998 |
| EP | 2133590 A2 | 12/2009 |
| FR | 2365738 A1 | 4/1978 |
| WO | 2006104729 A1 | 10/2006 |
| WO | 2012050791 A1 | 4/2012 |

\* cited by examiner

HIGH PRESSURE OFFSET SEAL

FIELD

The present disclosure relates to a high pressure offset seal.

BACKGROUND

This section provides background information related to the present disclosure which is not necessarily prior art.

Seals are commonly used for sealing a gap disposed around an outer surface of an inner member received within a bore of an outer member, such as a fuel injector, a spark plug tube, or a shaft. Conventional seals incorporate a rubber outer dimension for engaging a bore and may have various inner dimension seal configurations for engaging a shaft or other inter member.

SUMMARY

This section provides a general summary of the disclosure, and is not a comprehensive disclosure of its full scope or all of its features.

A sealing system includes an outer member having a bore and an inner member received in the bore, the inner member including an outer surface with a shoulder. A seal member includes an outer annular insert having a first diameter and an inner annular insert having a second smaller diameter. An elastomeric body includes an outer portion over-molded on the outer annular insert and an inner portion over-molded on the inner annular insert and including an inner seal member extending radially inward from the inner annular insert. The elastomeric body including a webbing connecting the outer portion to the inner portion. the elastomeric body including a plurality of ribs extending radially outward from the inner portion of the elastomeric body along an interface between the webbing and the inner portion of the elastomeric body. The inner portion of the elastomeric body is against the shoulder on the inner member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Figure 1:
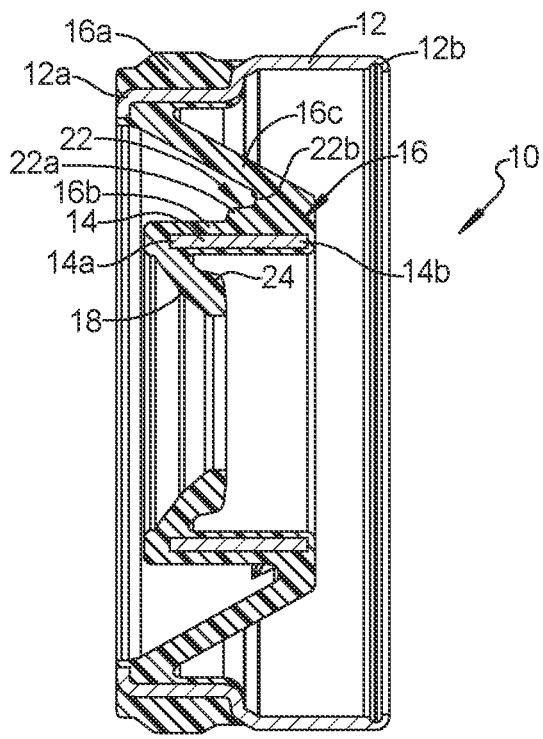
FIG. 1 is a cross sectional view of a high pressure offset seal according to the principles of the present disclosure.

With reference to FIG. 1, a cross-sectional view of a high pressure offset seal 10 is shown. The seal 10 includes an outer annular insert 12 having a first diameter and an inner annular insert 14 having a second diameter smaller than the first diameter. The outer annular insert 12 and the inner annular insert 14 each include a first end 12a, 14a and an opposite second end 12b, 14b and can be made from metal or plastic.

An elastomeric body 16 includes an outer portion 16a over-molded on the outer annular insert 12 and an inner portion 16b over-molded on the inner annular insert 14. The inner portion 16b further includes a seal lip 18 extending radially inward from the over-molded inner annular insert 14. The elastomeric body 16 includes a webbing 16c connecting the outer portion 16a to the inner portion 16b. The webbing 16c can extend diagonally from a first end 12a of the outer annular insert 12 to an opposite end 14b of the inner annular insert 14. The seal lip 18 can extend radially inward from the first end 14a of the over-molded inner annular insert 14. The elastomeric body 16 can include a various materials including but not limited to AEM, ACM, HNBR, VMQ and FKM.

Figure 2:
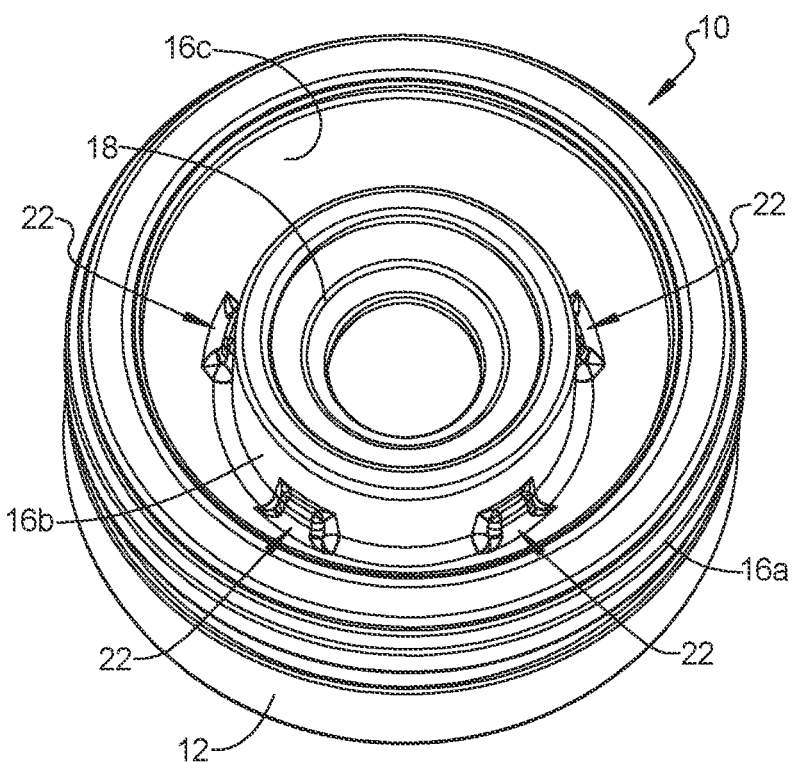
FIG. 2 is a perspective view of the high pressure offset seal shown in FIG. 1.

With reference to FIGS. 1 and 2, the elastomeric body 16 can further include a plurality of ribs 22 extending radially outward from the inner portion 16b of the elastomeric body 16 along an interface between the webbing 16c and the inner portion 16b of the elastomeric body 16. The ribs 22 can include a first portion 22a that extends along an outer portion of inner portion 16b and a second portion 22b that extends along the webbing 16c as shown. The plurality of ribs 22 can be circumferentially spaced around a perimeter of the inner portion 16b of the elastomeric body 16. The plurality of ribs 22 reduce the deformation of the webbing 16c to acceptable levels to improve the pressure capabilities. In order not to hinder the offset capability of the webbing 16c, the ribs 22 have a tiered geometry that allows the inside diameter portion of the seal lip 20 to hinge/turn so that the ribs are not over compressed in a maximum offset condition. The tiered shape of the ribs 22 also contains an additional pocket of material that reduces the strain in the rib when stretched. In the disclosed example embodiment, five ribs 22 are shown. However, more or fewer ribs 22 can be utilized. The ribs 22 expand the high pressure capability of the seal 10.

The seal lip 18 can include a flap of elastomeric material that in an undeformed state extends diagonally inward from the first end 14a of the inner annular insert 14. A radially outward facing surface of the seal lip 18 can include an annular bead 24 thereon.

Figure 3:
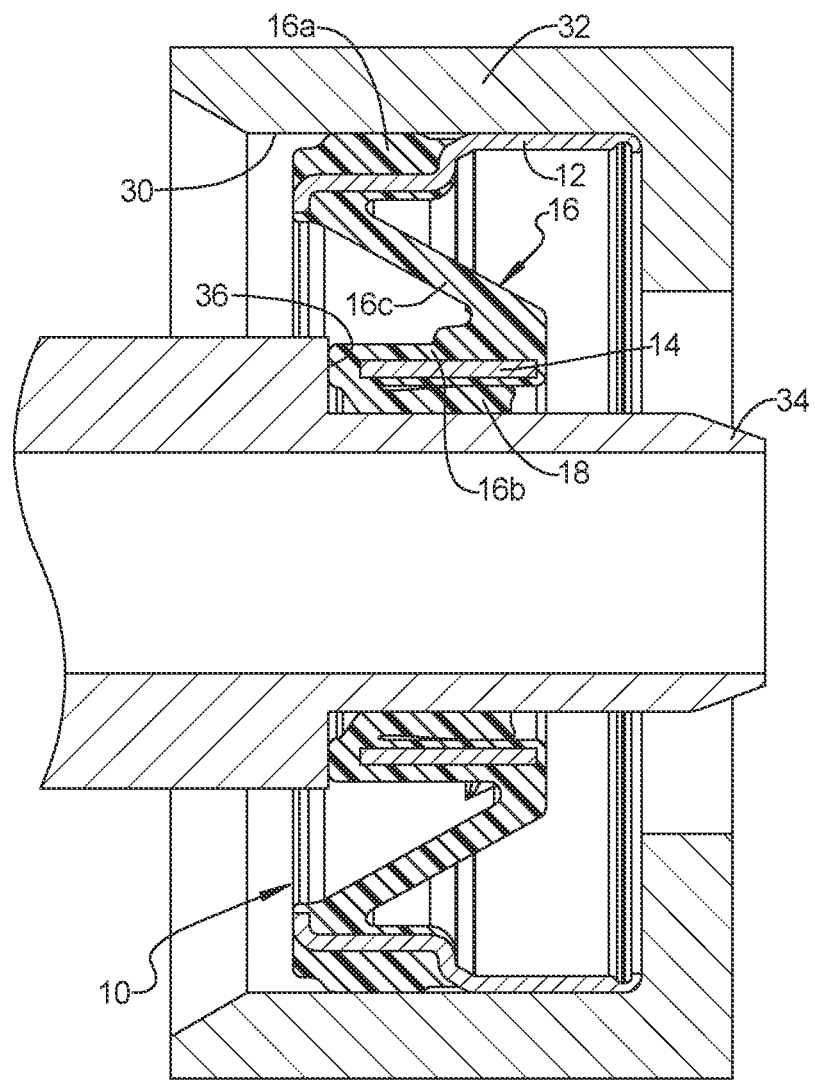
FIG. 3 is a cross-sectional view of a sealing system with the high pressure offset seal installed in between inner and outer members.

With reference to FIG. 3, the seal 10 is shown assembled within a bore 30 of an outer member 32 and engaging an inner member 34. It is noted that the seal 10 is shown superimposed within the outer member 32 in an undeformed state and it should be understood that the outer portion 16a would be deformed inward and the seal lip 18 would be compressed between the inner member 34 and the inner annular insert 14. The inner member 34 can include a shaft, a rod, a fuel injector, a spark plug tube or other member and includes a shoulder 36. The first end 14a of the inner annular insert 14 and the inner portion 16b of the elastomeric body 16 are disposed against the shoulder 36 on the inner member 34. The shoulder 36 is designed on the inner member 34 as a hard stop to prevent the axial movement of the inner diameter portion 16b of the seal due to high pressure. The raised shoulder 36 can have an outer diameter greater than a diameter of the inner annular insert 14. The seal lip 18 is compressed between the inner member 34 and the over-molded inner annular insert 14. The annular bead 24 of the seal lip 18 increases the compression of the seal lip 18.

The webbing 16c is designed to allow for offset between the inner member 34 and the outer member 32.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected, or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A sealing system, comprising:
an outer member having a bore;
an inner member received in the bore, the inner member including an outer surface with a shoulder;
a seal member having an outer annular insert having a first diameter, the outer annular insert having a first axial end and a second axial end, an inner annular insert having a second diameter smaller than the first diameter, the inner annular insert having a first axial end at a same end as the first axial end of the outer annular insert and a second axial end at a same end as the second axial end of the outer annular insert, the first axial end and the second axial end of the inner annular insert being contained between the first axial end and the second axial end of the outer annular insert, and an elastomeric body including an outer portion over-molded on the outer annular insert and an inner portion over-molded on an outer surface and an inner surface of the inner annular insert and including an inner seal member extending radially inward from the second axial end of the inner annular insert, wherein the inner seal member is compressed in a gap directly between the inner member and the over-molded inner surface of the inner annular insert after being compressed by the inner member, the elastomeric body including a webbing connecting the outer portion to the inner portion, the inner portion of the elastomeric body being disposed against the shoulder on the inner member, wherein the webbing extends diagonally from the second axial end of the outer annular insert to the first axial end of the inner annular insert, and a plurality of ribs extend radially outward from the inner portion of the elastomeric body along an interface between an inner radial surface of the webbing and an outer radial surface of the inner portion of the elastomeric body.

2. The sealing system according to claim 1, wherein the plurality of ribs are circumferentially spaced around a perimeter of the inner portion of the elastomeric body.

3. The sealing system according to claim 1, wherein the inner seal has an annular bead along an outer surface thereof.

* * * * *